United States Patent [19]
Davidson et al.

[11] Patent Number: 5,204,412
[45] Date of Patent: Apr. 20, 1993

[54] PHOTODEGRADABLE POLYMER COMPOSITION

[75] Inventors: Neil S. Davidson, Stirling, Scotland; Geoffrey Harrison, Hertfordshire, England; Kenneth Wilkinson, Pertshire, Scotland

[73] Assignee: BP Chemicals Limited, London, England

[21] Appl. No.: 614,630

[22] Filed: Oct. 31, 1990

[30] Foreign Application Priority Data

Apr. 13, 1989 [GB] United Kingdom ............... 8908342

[51] Int. Cl.$^5$ ............................................ C08G 67/02
[52] U.S. Cl. .................................. 525/185; 523/125; 525/539
[58] Field of Search ................. 525/185, 539; 523/125

[56] References Cited

U.S. PATENT DOCUMENTS

| | | | |
|---|---|---|---|
| 4,816,514 | 3/1989 | Lutz | 525/539 |
| 4,851,482 | 7/1989 | Danforth et al. | 525/539 |

FOREIGN PATENT DOCUMENTS 1002373  8/1965  United Kingdom ............... 525/185

*Primary Examiner*—James J. Seidleck
*Assistant Examiner*—Thomas Hamilton, III
*Attorney, Agent, or Firm*—Nixon & Vanderhye

[57] ABSTRACT

A photodegradable polymer composition comprising 50 to 99 weight percent based on the total weight of photodegradable polymer composition of a thermoplastic addition polymer and 1 to 50 weight percent based on the total weight of the photodegradable polymer composition of a photodegrading agent, said photodegrading agent being a polyketone which is a linear copolymer consisting of units of $-CO(C_2H_4)-$ and units $-CO(B')-$ where B' is derived from olefinically unsaturated hydrocarbon selected from the group consisting of $CHR_4=CHR_5$(I) and $CH_2=C(R_6)(CHR_7R_8)$ (II), wherein $R_4$ is a hydrocarbyl group, $R_5$ is hydrogen or a hydrocarbyl group, $R_6$ is a hydrocarbyl group, and $R_7$ and $R_8$ are individually hydrogen or hydrocarbyl groups.

6 Claims, No Drawings

PHOTODEGRADABLE POLYMER COMPOSITION

The present invention relates to the use of a photodegrading agent comprising a copolymer of one or more vinylidene monomers and carbon monoxide for enhancing the photodegradability of a thermoplastic polymer and to photodegradable polymer compositions comprising a thermoplastic polymer and the photodegrading agent.

There has been a considerable amount of research directed at finding solutions to the problem of disposing of plastic waste. One of the most commonly proposed solutions is to enhance the rate at which the plastic materials degrade under the action of the ultraviolet light of the sun.

Suggested methods for enhancing the photodegradability of thermoplastic polymers include the use of photosensitising agents, i.e. materials known to become activated to catalyse photodegradation in the presence of ultraviolet light. Photosensitising materials and their use are described, for example, in Ranby, B., Rabek, J. F. "Photodegradation, Photo-oxidation and Photostabilisation of Polymers", John Wiley & Sons, London (1975) and references cited therein. Among the many patents which disclose photosensitising agents and their use are U.S. Pat. Nos. 3,454,510, 4,495,311, 4,056,665 and British Patent No. 1 356 107. A disadvantage of such photosensitising materials is that they may sweat out or be extracted from the polymer composition over a period of time thus reducing the enhanced photodegradation effect. The possibility of the photosensitising material being extracted from the polymer composition may also make such degradable compositions unsuitable for use as food packaging.

Polymers having photosensitive chemical groups in their molecules are known to degrade on exposure to ultraviolet light. For example, ethylene copolymers containing carbonyl groups such as random copolymers of ethylene with carbon monoxide or copolymers produced by copolymerising ethylene with a vinyl ketone or grafting a vinyl ketone onto polyethylene are known to be photodegradable. The photosensitising component of such polymers, i.e. the carbonyl group, is chemically bound to the polymer and so is not subject to migration and leaching from the composition. However, it can be relatively expensive to produce these photodegradable polymers for the appropriate sections of the market.

It is also known to blend a minor proportion of a photodegradable polymer with another conventional polymer in order to enhance its photodegradability. For example, Canadian Patent No. 10000000 discloses a photodegradable polymer composition comprising a major proportion of at least one synthetic polymer or copolymer and a minor proportion of a ketone copolymer having ketone carbonyl groups located in side chains at a position immediately adjacent to the backbone of the polymeric chain. European Patent No. 230143 claims the use of a photodegrading agent comprising a photosensitising material and an ethylene/carbon monoxide polymer for enhancing the photodegradability of an ethylene polymer. In general, the photodegradable polymer used in such blends consists mainly of the same repeating units as the major polymer but contains a relatively small quantity of functional carbonyl groups, usually 10% or less by weight, randomly distributed along the polymer backbone. The photodegradable polymer is generally selected to be substantially miscible with the bulk polymer.

It has now suprisingly been found that copolymers containing a relatively large proportion of carbonyl groups (typically around 50% by weight) can be used to enhance the photodegradability of thermoplastic polymers even though the carbonyl-containing copolymers are relatively incompatible with the thermoplastic polymer.

Thus, according to the present invention, the use of a photodegrading agent comprising a copolymer of one or more vinylidene monomers and carbon monoxide for enhancing the photodegradability of a thermoplastic polymer is characterised in that the photodegrading agent is a polyketone which is a linear copolymer consisting of units —CO(A')— where (A') is derived from a vinylidene monomer (A) represented by the general formula:

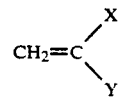

where X is selected from hydrogen and alkyl and Y is selected from hydrogen, alkyl, aryl, cycloalkyl, substituted alkyl, substituted aryl and substituted cycloalkyl groups. When X and/or Y is an alkyl group, it is preferably an alkyl group having from one to six carbon atoms. Preferably, X and Y are individually H or a $C_1$ to $C_6$ alkyl group, or X is H and Y is an aryl group.

The invention includes a photodegradable polymer composition comprising a thermoplastic polymer and a photodegrading agent characterised in that the photodegrading agent is a polyketone which is a linear copolymer consisting of units —CO(A')— where (A') is derived from a vinylidene monomer (A) represented by the general formula:

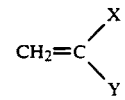

where X is selected from hydrogen and alkyl and Y is selected from hydrogen, alkyl, aryl, cycloalkyl, substituted alkyl, substituted aryl and substituted cycloalkyl groups. When X and/or Y is an alkyl group, it is preferably an alkyl group having from one to six carbon atoms. Preferably, X and Y are individually H or a $C_1$ to $C_6$ alkyl group, or X is H and Y is an aryl group.

Also claimed is a method for enhancing the photodegradability of a thermoplastic polymer comprising blending with the thermoplastic polymer a photodegrading agent characterised in that the photodegrading agent is a polyketone which is a linear copolymer consisting of units —CO(A')— where (A') is derived from a vinylidene monomer (A) represented by the general formula:

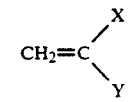

where X is selected from hydrogen and alkyl and Y is selected from hydrogen, alkyl, aryl, cycloalkyl, substituted alkyl, substituted aryl and substituted cycloalkyl groups. When X and/or Y is an alkyl group, it is preferably an alkyl group having from one to six carbon atoms. Preferably, X and Y are individually H or a $C_1$ to $C_6$ alkyl group, or X is H and Y is an aryl group.

The photodegradation of any thermoplastic polymer can be enhanced by the present invention. However, the melting temperature of the thermoplastic polymer should preferably be such that the photodegradable polymer composition can be melt processed at a temperature below the onset of severe thermal degradation of the photodegrading agent. Generally, a thermoplastic polymer is melt processed at a temperature at least 20° C. above its melting temperature. Thus, the photodegrading agent is preferably substantially stable at a temperature 20° C. higher than the melting temperature of the thermplastic polymer.

The thermoplastic polymer can be an addition polymer of one or more vinylidene monomers represented by the general formula:

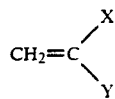

where X is selected from hydrogen, chloro, fluoro and alkyl and Y is selected from hydrogen, alkyl, aryl, substituted aryl, alicyclic, alkenyl, alkoxy, acyloxy, carboxylic acid ester, substituted aryl carboxylic acid, amido, hydroxy, cyano, chloro, fluoro. When X and/or Y is an alkyl group, it is preferably an alkyl group having from one to six carbon atoms. Preferably, X and Y are individually H or a $C_1$ to $C_6$ alkyl group.

Condensation polymers can also be used in the present invention. Suitable condensation polymers include polyamides, polyesters, polyurethanes, polyethers, polyepoxides, polyamide esters, polyimides, poly(amide-imides), polyureas and polyamino acids.

The thermoplastic polymer can be a blend of two or more such polymers. For example, it could be an impact polystyrene, i.e. a blend of polystyrene and an elastomer.

Examples of suitable thermoplastic polymers are polystyrene and polyethylene. The polyethylene can be, for example, a homopolymer of ethylene or a copolymer of ethylene and up to 20 weight percent by weight of copolymerisable alpha olefin having from 3 to 18 carbon atoms.

The photodegrading agent can be a polyketone which is a linear 1:1 alternating copolymer of carbon monoxide with at least one alpha olefinically unsaturated compound, i.e. a copolymer consisting of units —CO(A')— where A' is derived from a vinylidene monomer (A) as defined hereinbefore. The alternating structure may contain small regimes (up to about 10% by weight) of the corresponding polymer of the vinylidene monomer. Examples of suitable vinylidene monomers are styrene and ethylene.

Although copolymers of carbon monoxide and ethylene are suitable for use in the present invention, they have a relatively high melting point, e.g. about 257° C. Melt processing of these polymers can be difficult because typically such processing takes place at a temperature at least 20° C. above the melting point and at such high temperatures the carbon monoxide/ethylene copolymers can undergo unacceptable thermal degradation, i.e. they can discolour and/or decompose.

It is a surprising feature of the present invention that the photodegradability of a thermoplastic polymer can be enhanced by the use of a solid ethylene/carbon monoxide copolymer which is not melt blended with the thermoplastic polymer, but is blended as a solid with solid or molten thermoplastic polymer and remains solid even when the polymer composition is melted during fabrication.

European Patent Application 0213671 discloses that it is possible to reduce the melting point of copolymers of carbon monoxide and ethylene, to a value between 150° and 245° C., without serious detriment to the thermal stability of the polymers, by including in the monomer mixture to be polymerised a relatively small quantity of one or more other olefinically unsaturated hydrocarbons (B) with less than 20 carbon atoms. The copolymers are linear and consist of randomly distributed units of —CO($C_2H_4$)— and —CO—(B')— where B' is derived from the olefinically unsaturated hydrocarbon (B).

European Patent Application 0264159 also relates to copolymers of ethylene, carbon monoxide and at least one unsaturated hydrocarbon (B) which contains less than 20 carbon atoms in which the unsaturated hydrocarbon (B) has the general formula $CH_2=C(R_1)(CH R_2R_3)$ wherein $R_1$ is a hydrocarbyl group and $R_2$ and $R_3$ are hydrogen and/or hydrocarbyl groups.

The photodegrading agent used in the present invention is preferably a copolymer of ethylene, carbon monoxide and at least one unsaturated hydrocarbon (B) substantially as described in European Patent Application 0264159 or European Patent Application 0213671. (The term copolymer as used in this specification should be taken to mean a polymer comprised of units derived from two or more monomers).

Thus, according to the present invention, the photodegrading agent is preferably a polyketone which is a linear copolymer having a melting point of between 150° and 245° C. which consists of units of —CO—($C_2H_4$)— and units of —CO—(B')— where B' is derived from one or more olefinically unsaturated monomers (B) having less than 20 carbon atoms.

The olefinically unsaturated monomer (B) can be represented by one of the general formulae:

$$CHR_4=CHR_5 \qquad (I)$$

$$CH_2=C(R_6)(CHR_7R_8) \qquad (II)$$

in which
 $R_4$ is a hydrocarbyl group
 $R_5$ is hydrogen or a hydrocarbyl group
 $R_6$ is a hydrocarbyl group
 $R_7$ and $R_8$ are individually hydrogen or hydrocarbyl groups If the photodegrading agent is produced by polymerising carbon monoxide, ethylene and two or more olefinically unsaturated monomers (B), the copolymer will contain different units of —CO(B')—. The monomers (B) preferably contain less than ten carbon atoms.

In general formula (I) for the monomers B, $R_4$ and $R_5$ can together form part of a cyclic structure, e.g. cyclopentene or cyclohexene. $R_4$ and $R_5$, if it is a hydrocarbyl group, are preferably alkyl groups. Preferred monomers B of general formula I are represented by the formula $C_nH_{2n}$ where n is 3 to 8.

In general formula II for the monomers B, $R_6$ and $R_7$ and $R_8$, if either is a hydrocarbyl group, are preferably alkyl groups. More preferably, $R_6$ is methyl or ethyl, $R_7$ is hydrogen and $R_8$ is hydrogen or a $C_1$–$C_4$ alkyl group. Examples of suitable monomers of the general formula II are 2-methyl propene-1, 2-methyl butene-1, 2-methyl pentene-1, 2-ethyl butene-1, 2-ethyl pentene-1 and 2,4,4 trimethyl pentene.

Interpolymers of vinylidene monomers and carbon monoxide suitable for use as the photodegrading agent of the present invention can be produced using known processes. For example, carbon monoxide/ethylene/-monomer B copolymers for use as the photodegrading agents of the present invention can be prepared according to the processes disclosed in European Patent Applications EP-A-213671 and EP-A-264159.

Preferred processes for the production of polyketones suitable for use as the photodegrading agent of the present invention are described in European Patent Applications 88 309 063 and 88 309 064 which were both filed on Sep. 29, 1988 and claim priority from UK Patent Applications Nos. 8723603 and 8723602 respectively.

European Patent Application Nos. 88 309 064 relates to a process for preparing polyketones by reacting a mixture of carbon monoxide and one or more olefins in the presence of a palladium catalyst prepared by reacting together (1) a source of palladium (2) an amine, phosphine, arsine or stibine and (3) a non-coordinating or weakly coordinating anion in which the process is carried out in the presence of an effective amount of an amide or nitrile. The amide can be, for example, dimethylformamide.

European Patent Application No. 88 309 064 relates to a process for preparing polyketones by polymerising a mixture of carbon monoxide and one or more olefins in the presence of a palladium catalyst in which the palladium catalyst is prepared by reacting together:

(a) a source of palladium,
(b) a bidentate amine, phosphine, arsine or stibine having the formula $(R^1)_2M—R^2—M(R^1)_2$ wherein the M atoms are independently selected from nitrogen, phosphorous, arsenic or antimony, the $R^1$ groups are independently alkyl, cycloalkyl or aryl groups and $R^2$ is an alkylene group, and
(c) a source of an anion having the formula:

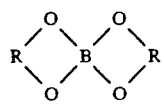

wherein the R groups are independently selected from the group consisting of $C_1$ to $C_6$ alkylene groups, orthophenylene or biphenylene groups or substituted derivatives thereof or groups having the formula:

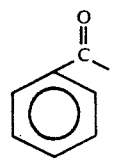

or substituted derivatives thereof.

The disclosures of European Applications EP 88 309 063 and EP 88 309 064 are incorporated herein by reference.

The amount of photodegrading agent included in the thermoplastic polymer will generally be from 1 to 50, typically from 3 to 20 per cent by weight of the total weight of the blend and is preferably from 5 to 15 per cent by weight.

Known methods can be used for blending together the photodegrading agent and the thermoplastic polymer. The components can, for example, be mixed by dry mixing of powders, by solution blending or melt blending. The mixing method used is not critical provided that the mixing temperature is not so high that it causes unacceptable decomposition of the photodegrading agent. The blends generally comprise a heterogeneous mixture of the photodegrading agent dispersed in the thermoplastic polymer.

The photodegradable composition can be moulded, extruded and fabricated into intermediate or end products using conventional apparatus and techniques. The temperatures at which the compositions are fabricated should be sufficiently low that unacceptable decomposition of the photodegrading agents is avoided. The photodegradable compositions are particularly useful for applications which are likely to become litter such as wrapping films, containers, disposable cutlery, food trays and the like and also for agricultural mulch films.

The photodegradable polymer compositions according to the present invention have a relatively poor stability to ultraviolet light. The material from which articles are fabricated becomes hard and brittle when exposed to sunlight and finally breaks or crumbles into small particles. Thus, such articles will fulfil their function but when discarded will photodegrade relatively quickly.

The invention is illustrated by the following examples.

EXAMPLES 1 TO 5 AND COMPARATIVE EXAMPLES A AND B

Five photodegradable polymer compositions according to the present invention were prepared by blending different amounts of a linear alternating ethylene/carbon monoxide copolymer (E/CO) with a low density polyethylene (LDPE). The components were blended together at 180° C. in a Brabender Plasti-Corder, a laboratory batch melt mixer (BRABENDER and PLASTI-CORDER are registered trade marks).

The low density polyethylene used is a commercially available grade sold by BP Chemicals Limited under the trade designation Novex LD 5310AA (NOVEX is a trade mark) which has a melt index (190° C., 2.16 kg) of about 1.0 g/10 mins and a density of about 0.92 g/cm$^3$.

The ethylene/carbon monoxide copolymer used in Examples 1 to 5 was prepared by charging a 300 cm$^3$ autoclave with palladium acetate (100.2 mg), 1,3-bis(diphenylphosphino)propane (227.2 mg) and H[B(OC$_6$H$_4$CO$_2$)$_2$] (2.0003 g) in methanol (50 cm$^3$); introducing ethylene (21 bar) followed by carbon monoxide (30 bar) and heating to 100° C. After a pressure drop of 25 bar, the autoclave was charged with further ethylene (10 bar) and carbon monoxide (10 bar). After a further pressure drop of 10 bar, the autoclave was allowed to cool. The total reaction time was 68 minutes. The white polymer (61.08 g) isolated had a melting point of 234° C. and an intrinsic viscosity of 0.13 dl/g.

Sheets were prepared from the blends by compression moulding at 180° C. Samples were cut from the compression moulded sheets and subjected to accelerated UV ageing using a Xenotest 450, a commercial accelerated weathering apparatus. The samples were exposed, at 20° C. and 80% relative humidity to a light source emitting a UV spectrum equivalent to that of sunlight in the Northern latitudes. The embrittlement time, i.e. the length of time for which the sample can be exposed to the UV light before it cracks when flexed by hand, was determined for each blend and is given in Table 1.

For comparison, the embrittlement time for the LDPE alone Comparative Example A was determined and is given in Table 1. Also, for comparison, the embrittlement time for a linear alternating ethylene copolymer having a melting point of 258° C. and an intrinsic viscosity, measured in m-cresol at 30° C. of 1.15 dl/g was determined; the sample having been compression moulded at 260° C. (Comparitive Example B). The result is also given in Table 1.

EXAMPLE 6

A photodegradable polymer composition was prepared by blending 5% by weight of an ethylene/hexene/carbon monoxide copolymer (E/H/CO) with 95% by weight of the same low density polyethylene as used in Examples 1 to 5. The components were blended in a Brabender Plasti-Corder at 210° C.

The ethylene/hexene/carbon monoxide copolymer had a melting point of about 207° C. and comprised 46 mole % ethylene, 4 mole % hexene and 50 mole % carbon monoxide. It was prepared by charging a 150 cm$^3$ stainless steel autoclave with palladium acetate (25.4 mg), 1,3-bis (diphenylphosphino) propane (67.6 mg) and $H[B(OC_6H_4CO_2)_2]$ (600.1 mg) in methanol (30 cm$^3$); then adding hexene-1 (20 cm$^3$), purging with nitrogen, sealing the autoclave and purging again with nitrogen before charging with ethylene (20 bar) followed by carbon monoxide (30 bar) and heating to 70° C. After 92 minutes, the autoclave was cooled and the white polymer (2.96 g) isolated by filtration.

The components were blended at a temperature above the melting point of the ethylene/hexene carbon monoxide copolymer. Scanning eletron microscopy showed the two components of the blend to be phase separated, but the copolymer was better dispersed in the low density polyethylene than was the ethylene/carbon monoxide copolymer in the blends of Examples 1 to 5.

The embrittlement temperature of the blend is given in Table 1.

EXAMPLE 7 AND COMPARATIVE EXAMPLE C

A photodegradable polymer composition was prepared as for Example 6 except that the ethylene/hexene/carbon monoxide copolymer was replaced by ethylene/propylene/carbon monoxide copolymer (E/P/CO).

The ethylene/propylene/carbon monoxide copolymer was prepared by charging a 300 cm$^3$ stainless steel autoclave with palladium acetate (5 mg), 1,3-bis(diphenylphosphino) propane, p.toluene sulphonic acid (68 mg), 1,4-benzoquinone (100 mg), dimethylformamide (0.07 cm$^3$) and methanol (100 cm$^3$) and then cooling in a carbon dioxide/acetone bath and condensing in the autoclave propylene (58 g) before sealing the autoclave, allowing it to warm to room temperature and introducing ethylene (20 bar) and carbon monoxide (20 bar).

After heating at 70° C. for 4 hours, the autoclave was cooled and vented. The yellow polymer (7.42 g) isolated by filtration had a melting point of 180° C. and an intrinsic viscosity of 0.5 dl/g.

The embrittlement temperatures of the blend and, for comparison, the ethylene/propylene/carbon monoxide copolymer alone (Comparative Example C) are given in Table 1.

EXAMPLE 8 AND COMPARATIVE EXAMPLE D

A photodegradable polymer composition according to the invention was prepared by blending 5% by weight of a styrene/carbon monoxide copolymer (S/CO) with 95% by weight of polystyrene (PS). The components were blended together in a Brabender Plasti-Corder at 215° C.

The polystrene used was a commerically available, additive-free polystyrene sold by BP Chemicals under the trade designation HH 101 which has a melt index (200° C., 5 kg) of about 2.5 g/10 minutes.

The styrene/carbon monoxide copolymer was prepared by charging a 150 cm$^3$ stainless steel autoclave with palladium acetate (15 mg), 2,2' bipyridyl (240 mg), p.toluene sulphonic acid (200 mg), 1,4-benzoquinone (2 g), methanol (5 cm$^3$) and styrene (25 cm$^3$); flushing with nitrogen and then introducing carbon monoxide (40 bar) and the heating at 90° C. for 1½ hours. After cooling the autoclave, the contents were poured into methanol (100 cm$^3$) and the white polymer (10.91 g) isolated by filtration.

The embrittlement time of the composition was determined to be 13 days compared with 20 days for the polystyrene alone (Comparative Composition D).

TABLE 1

| Example or Comparative Composition | Thermoplastic Polymer | | Photodegrading Agent | | Sample Thickness (micron) | Embrittlement Time (Days) |
|---|---|---|---|---|---|---|
| | Type | (% wt) | Type | (% wt) | | |
| A | LDPE | 100 | — | — | 130 | 110 |
| 1 | LDPE | 97 | E/CO | 3 | 185 | 90 |
| 2 | LDPE | 95 | E/CO | 5 | 350 | 75 |
| 3 | LDPE | 90 | E/CO | 10 | 400 | 55 |
| 4 | LDPE | 80 | E/CO | 20 | 370 | 44 |
| 5 | LDPE | 50 | E/CO | 50 | 480 | 40 |
| B | — | — | E/CO | 100 | 190 | 35 |
| 6 | LDPE | 95 | E/H/CO | 5 | 160 | 60 |
| 7 | LDPE | 95 | E/P/CO | 5 | 160 | 65 |
| C | — | — | E/P/CO | 100 | 125 | 10 |
| 8 | PS | 95 | S/CO | 5 | 170 | 13 |
| D | PS | 100 | — | — | 105 | 20 |

We claim:

1. A photodegradable polymer composition comprising 50 to 99 weight percent based on the total weight of photodegradable polymer composition of a thermoplastic addition polymer and 1 to 50 weight percent based on the total weight of the photodegradable polymer composition of a photodegrading agent, said photodegrading agent being a polyketone which is a linear copolymer consisting of units of —$CO(C_2H_4)$— and units —$CO(B')$— where B' is derived from olefinically unsaturated hydrocarbon selected from the group consisting of $CHR_4$=$CHR_5$ (I) and $CH_2$=$C(R_6)(CHR_7R_8)$ (II), wherein $R_4$ is a hydrocarbyl group, $R_5$ is hydrogen or a hydrocarbyl group, $R_6$ is a hydrocarbyl group, and $R_7$ and $R_8$ are individually hydrogen or hydrocarbyl groups.

2. A photodegradable polymer composition as claimed in claim 1, in which the thermoplastic addition polymer is an ethylene homopolymer or a copolymer of ethylene and up to 20 weight percent of a copolymerizable alpha olefin having from 3 to 18 carbon atoms.

3. A photodegradable polymer composition as claimed in claim 1, wherein the monomer of formula (II) is selected from the group consisting of 2-methyl propene-1, 2-methyl butene-1, 2-methyl pentene-1, 2-ethyl butene-1, 2-ethyl pentene-1, and 2,4,4-trimethylpentene.

4. A photodegradable polymer composition as claimed in claim 1, wherein said olefinically unsaturated hydrocarbon is propylene.

5. A photodegradable polymer composition as claimed in claim 1, in which the photodegrading agent comprises from 3 to 20 percent by weight of the photodegradable polymer composition.

6. A method for enhancing the photodegradability of a thermoplastic addition polymer, said method comprising the step of blending with the thermoplastic addition polymer 1 to 50 weight percent of the photodegrading agent, said photodegrading agent being a polyketone which is a linear copolymer consisting of units of $-CO(C_2H_4)-$ and units $-CO(B')-$ where $B'$ is derived from olefinically unsaturated hydrocarbon selected from the group consisting of $CHR_4=CHR_5$ and $CH_2=C(R_6)(CHR_7R_8)$, wherein $R_4$ is a hydrocarbyl group, $R_5$ is hydrogen or a hydrocarbyl group, $R_6$ is a hydrocarbyl group, and $R_7$ and $R_8$ are individually hydrogen or hydrocarbyl groups.

* * * * *